UNITED STATES PATENT OFFICE.

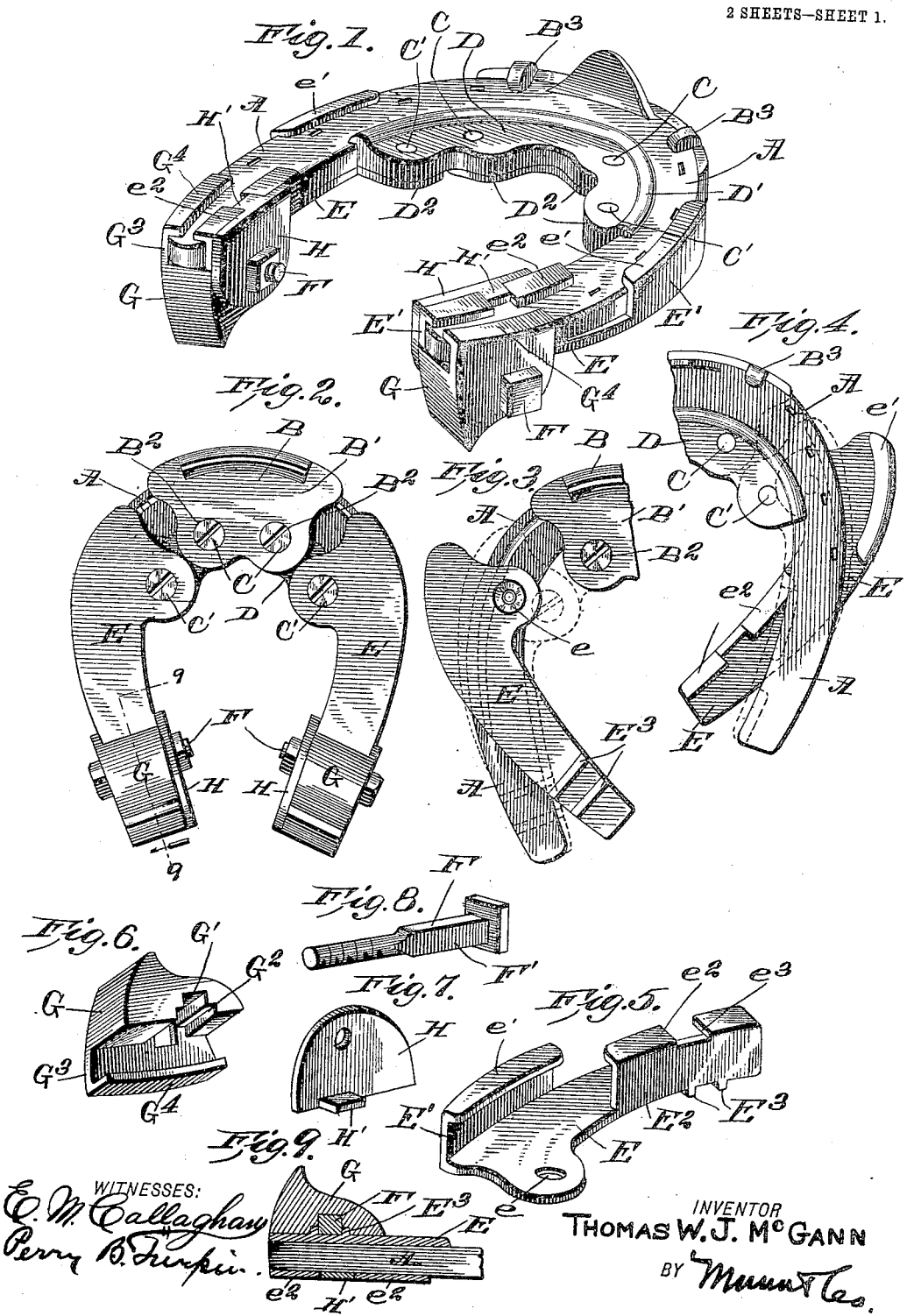

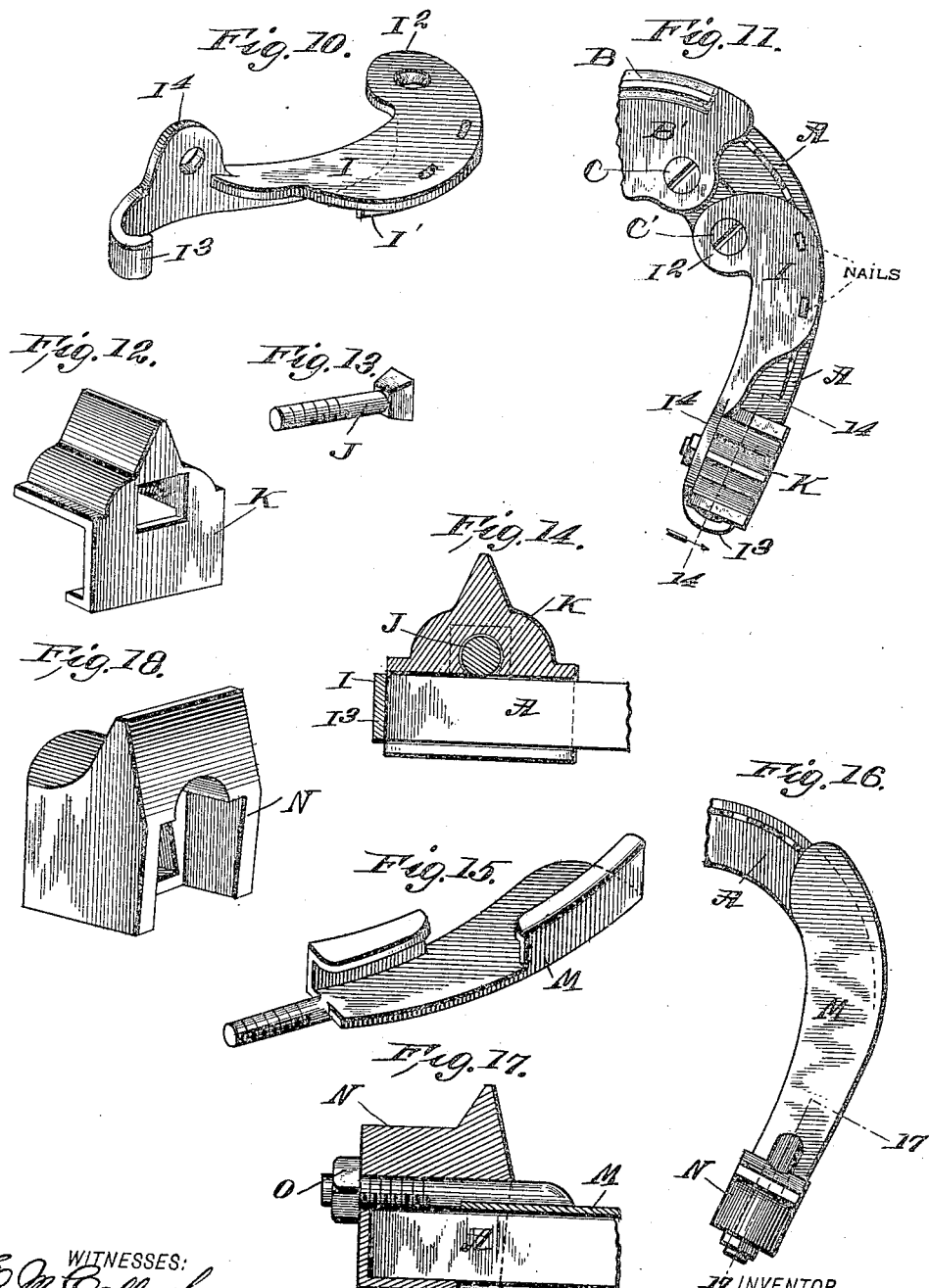

THOMAS W. J. McGANN, OF WASHINGTON, DISTRICT OF COLUMBIA, ASSIGNOR OF ONE-HALF TO AENEAS COLLINS, OF WASHINGTON, DISTRICT OF COLUMBIA.

DETACHABLE CALK FOR HORSESHOES.

No. 817,586.      Specification of Letters Patent.      Patented April 10, 1906.

Application filed January 31, 1906. Serial No. 298,814.

*To all whom it may concern:*

Be it known that I, THOMAS W. J. McGANN, a citizen of the United States, and a resident of Washington city, in the District of Columbia, have made certain new and useful Improvements in Detachable Calks for Horseshoes, of which the following is a specification.

My invention is an improvement in detachable calks for horseshoes, and has for an object to provide a simple construction which can be readily applied to the ordinary horseshoe when on the horse's hoof and easily removed and will be efficient for the purpose for which it is designed when applied; and the invention consists in certain novel constructions and combinations of parts, as will be hereinafter described and claimed.

In the drawings, Figure 1 is a perspective view of the upper side of a horseshoe provided with my improved calk. Fig. 2 is a plan view of the lower side of a horseshoe provided with the calk. Fig. 3 is a detail plan view of the side of a horse's shoe with the base-plate arranged diagonally to the arm of the shoe and with the said base-plate as in the act of applying the said plate to the shoe. Fig. 4 is a detail plan view from the opposite side of the parts shown in Fig. 3. Fig. 5 is a detail perspective view of one of the base-plates. Fig. 6 is a detail perspective view of the body portion of the heel-calk. Fig. 7 is a detail perspective view of the clamping-plate of said body-section. Fig. 8 is a detail perspective view of the bolt for securing the heel-calk. Fig. 9 is a detail section on about the line 9 9 of Fig. 2. Fig. 10 is a detail perspective view of a somewhat different construction of heel-plate from that shown in Figs. 1, 2, 3, 4, and 5. Fig. 11 is a top plan view of a portion of a shoe, showing the heel-plate illustrated in Fig. 10 applied. Fig. 12 is a detail perspective view of the heel-calk for use with the heel-plate shown in Fig. 10. Fig. 13 is a detail perspective view of the bolt for securing the heel-calk shown in Fig. 12. Fig. 14 is a detail sectional view on about line 14 14 of Fig. 11. Fig. 15 is a detail perspective view of a still different form of heel-plate. Fig. 16 is a view of a portion of a horseshoe with the heel-plate shown in Fig. 15 applied. Fig. 17 is a detail section on about line 17 17 of Fig. 16, and Fig. 18 is a detail perspective view of the heel-calk shown in Figs. 16 and 17.

As shown in Figs. 1 and 2, the shoe A may be of ordinary construction. To this shoe A is applied the toe-calk B, whose plate B' extends back beneath the shoe A and beyond the rear edge of the crown of said shoe and is perforated at $B^2$ for the passage of the bolts C, by which the said calk-plate B' is held to the inner toe-clamping plate D, as will be understood from Figs. 1 and 2 of the drawings. The calk-plate B' is provided with the lugs $B^3$, overlying the inner face of the shoe A, and the clamping-plate D is provided with the flange D', overlying the inner face of the shoe, and the screws C connect the plates B' and D immediately in rear of the crown of the horseshoe and secure the said parts firmly in connection with each other and upon the shoe as desired.

The plate D is provided in rear of and beyond the holes for the screws C with extensions or lugs $D^2$, which are perforated for the passage of the screws C', which secure the base or heel plates E at their front ends in connection with the clamp-plate D at the opposite sides thereof, as shown in Figs. 1 and 2 of the drawings. These heel or base plates E are alike, except that they are made rights and lefts, and are illustrated in detail in Fig. 5. An important feature of these heel-plates is the construction whereby they interlock with their respective arms of the horseshoe by a swinging action on a center approximately midway between the ends of the said plates. To this end the heel-plates E are provided at their front and rear ends at their outer and inner edges with upwardly-projecting wings E' and $E^2$, which extend up along the outer and inner sides of a horseshoe when applied, as shown in Fig. 1, and are provided at their upper edges with inwardly-projecting flanges $e'$ and $e^2$, which extend inwardly along the upper side or face of the horseshoe when the heel-plate is adjusted into position for use, as shown in Figs. 1 and 2. These wings E' and $E^2$ are spaced apart at their adjacent ends in the direction of length of the plate, whereby the plate may be fitted diagonally to the shoe, as shown in Figs. 3 and 4, and then swung on a pivot approximately midway between the ends of the heel-plate to the position shown in Figs. 1 and 2 and indicated in dotted lines, Figs. 3 and 4, and in which position the flanges $e^3$ and $e^2$ will engage above the shoe at the outer and inner edges thereof in such manner as to prevent any displacement of the heel-plate when the parts are secured by the application of the heel-calks in the manner more fully described hereinafter. At their front ends the heel-plates are provided with the inwardly-projecting lugs $e$, which overlap the lugs $D^2$ of the plate D and are secured by the screws $C'$, thus anchoring the heel-plates securely to the toe-calk devices, as will be understood from Figs. 1 and 2 of the drawings.

Means are provided in connection with the heel-plates for securing the heel-calks. In the construction shown in Figs. 1 to 9 the heel-plates are provided on their outer faces, near their rear ends, with outwardly-projecting parallel ribs $E^3$, which extend transversely and are spaced apart a sufficient distance to receive between them the bolts F for securing the heel-calks in place. These heel-calks each include a body-section G and a plate-section H. The body-section is recessed in its under side at $G'$ to receive the squared portion $F'$ of the bolt F, and this recess $G'$ is rabbeted at $G^2$ to receive the ribs $E^3$ of the heel-plate, so that when the body G is applied to the heel-plate and secured by the screw F the body G will by engagement with said ribs $E^3$ be braced against displacement, so that the entire strain will not be borne by the screw F, whose squared portion $F'$ fits between the ribs $E^3$, as best shown in Fig. 9 of the drawings. At its outer side the body G has an upwardly-projecting plate $G^3$, which is flanged at $G^4$ to engage above the horseshoe, and thus aid in holding the calk in place. The side plate H is secured by the bolt F and is provided at its upper edge with an inwardly-projecting lug $H'$, which extends along the upper face of the shoe and fits within a notch $e^3$ in the flange $e^2$ of the heel-plate E. By this construction it will be noticed the heel-calk is secured by the positive engagement of its body portion at $G^2$ with the ribs $E^3$ of the heel-plate as well as by the fitting of the securing-bolt F between the said ribs and the engagement of the flanges $G^4$ and $H'$ above the shoe. This construction, it will be noticed, involves no structural change in the horseshoe and provides a construction which can be readily applied to and removed from the ordinary horseshoe without removing the shoe from the horse's hoof, and this can be done without necessitating the holding of the horse's hoof in an elevated position for any considerable time and will not interfere with the foot being lowered at any time should the horse become restless. This is an important feature of the present invention, which is especially designed for high-class horses, which are frequently spirited and would injure themselves if maintained in any unusual position for any considerable period.

In Figs. 10 and 11 I show a somewhat different construction of heel-plate for interlocking with the horseshoe. This heel-plate I, it will be noticed, is provided on its upper face, near its outer edge, with a longitudinal rib $I'$, which conforms in cross-section and longitudinally with the nail-groove in the shoe and fits therein when the heel-plate I is applied to the shoe. This heel-plate is also provided at its front edge with a lug $I^2$ to receive the screw $C'$, by which it is secured to the toe-clamping plate, and the heel-plate is curved at its rear end at $I^3$ to fit around the heel of the shoe, and adjacent to said curved end $I^3$ it is provided with an upwardly-projecting lug $I^4$, perforated for the passage of the screw J, which secures the heel-calk K (shown in Fig. 12) in connection with the shoe and the said heel-plate, as will be understood from Figs. 10, 11, and 12.

In Figs. 15, 16 I illustrate another somewhat different construction of heel-plate from that shown in Figs. 1 to 5. This heel-plate M is, like the plate E, provided on one side of its front end and on the opposite side of its rear end with upwardly-projecting wings adapted at their free edges to overlie a horseshoe and is further provided at its rear end with rearwardly-projecting threaded bolts, over which the heel-calks N are fitted to a position in which they embrace the rear ends of the shoe, as shown, and are secured by the nuts O. This latter construction will be found useful in connection with the hind shoes, but may not be preferred for front shoes, as the projecting bolts might in such instance injure the animal in traveling.

Having thus described my invention, what I claim as new, and desire to secure by Letters Patent, is—

1. In a detachable calk device for horseshoes, the combination with the toe-calk and its plate, and the clamp-plate and screws securing the same to the calk-plate, the said clamp-plate having rearwardly-projecting lugs or extensions perforated for screws, the heel-plates provided at their front ends with lugs overlapping the lugs or extensions of the clamp-plate, and also provided at their outer and inner sides with the upwardly-projecting wings having at their free edges inwardly-extending flanges to overlie the inner face of the shoe, said wings and flanges being spaced apart at their adjacent ends whereby to permit the swinging of the heel-plates into interlocked connection with their respective arms of a horseshoe, said heel-plates being provided near their rear ends with outwardly-projecting ribs spaced apart, the heel-calk having a body portion and a side plate flanged at their upper edges to overlie a horseshoe, the said body portion having a bolt recessed and rabbeted to receive the ribs of the heel-plate, and a cross-bolt fitting in the recess of the body-section and between the ribs of the heel-plate.

2. In a calk device for horseshoes, a heel-plate provided at its front and rear ends at its outer and inner edges with upwardly-projecting wings having at their free edges inwardly-projecting flanges to engage above a shoe, and the wings being spaced apart at their adjacent ends in the direction of length of the plate whereby the plate may be fitted diagonally to a shoe and swung into interlocking connection therewith, a heel-calk, and means for securing the heel-calk to the said heel-plate.

3. In a calk device for horseshoes, a heel-plate provided in advance and rear of its middle portion at its outer and inner edges with opposing upwardly-projecting wings, provided at their upper free edges with inwardly-projecting flanges to overlie a horseshoe, the said wings being spaced apart at their adjacent ends whereby they may be applied diagonally to the arms of a horseshoe and swung into alinement therewith for interlocking with the shoe.

4. In a calk device for horseshoes, the combination of a toe-calk, heel-plates, means connecting the front ends of the heel-plates with the toe-calk, and heel-calks applied to the rear ends of the heel-plates.

5. The combination in a calk device with a heel-plate having outwardly-projecting transverse ribs, of a heel-calk having a body portion provided with a transverse recess rabbeted to receive the said transverse ribs, and the bolt fitting in said recess between the said ribs, and the side plate held by the said bolt in connection with the body portion.

6. The combination in a calk device with a heel-plate having outwardly-projecting transverse ribs, of a heel-calk having a body portion engaging the said ribs, and a bolt for securing said heel-calk, the said bolt being also in engagement with the transverse ribs.

7. The combination in a calk device for horseshoes, of a heel-plate having an upwardly-projecting wing, provided at its free edge with an inwardly-projecting flange to overlie a horseshoe and notched from its inner edge between its ends, of a heel-calk applied to said plate and having an inwardly-projecting flange operating in the notch of the said heel-plate flange, whereby to overlie with said flange the inner face of a horseshoe.

8. In a calk device for horseshoes, the combination of a heel-plate adapted to swing into interlocking engagement with its respective arm of a horseshoe, a heel-calk applied to said heel-plate, and means for securing the heel-calk when so applied.

9. In a calk device for horseshoes, a heel-plate having at one edge at its front end, and at its opposite edge at its rear end, upwardly-projecting wings provided at their free edges with inwardly-extending flanges to overlie the upper face of a horseshoe when the heel-plate is swung into engagement therewith.

THOMAS W. J. McGANN.

Witnesses:
SOLON C. KEMON,
PERRY B. TURPIN.